United States Patent Office 2,875,472
Patented Mar. 3, 1959

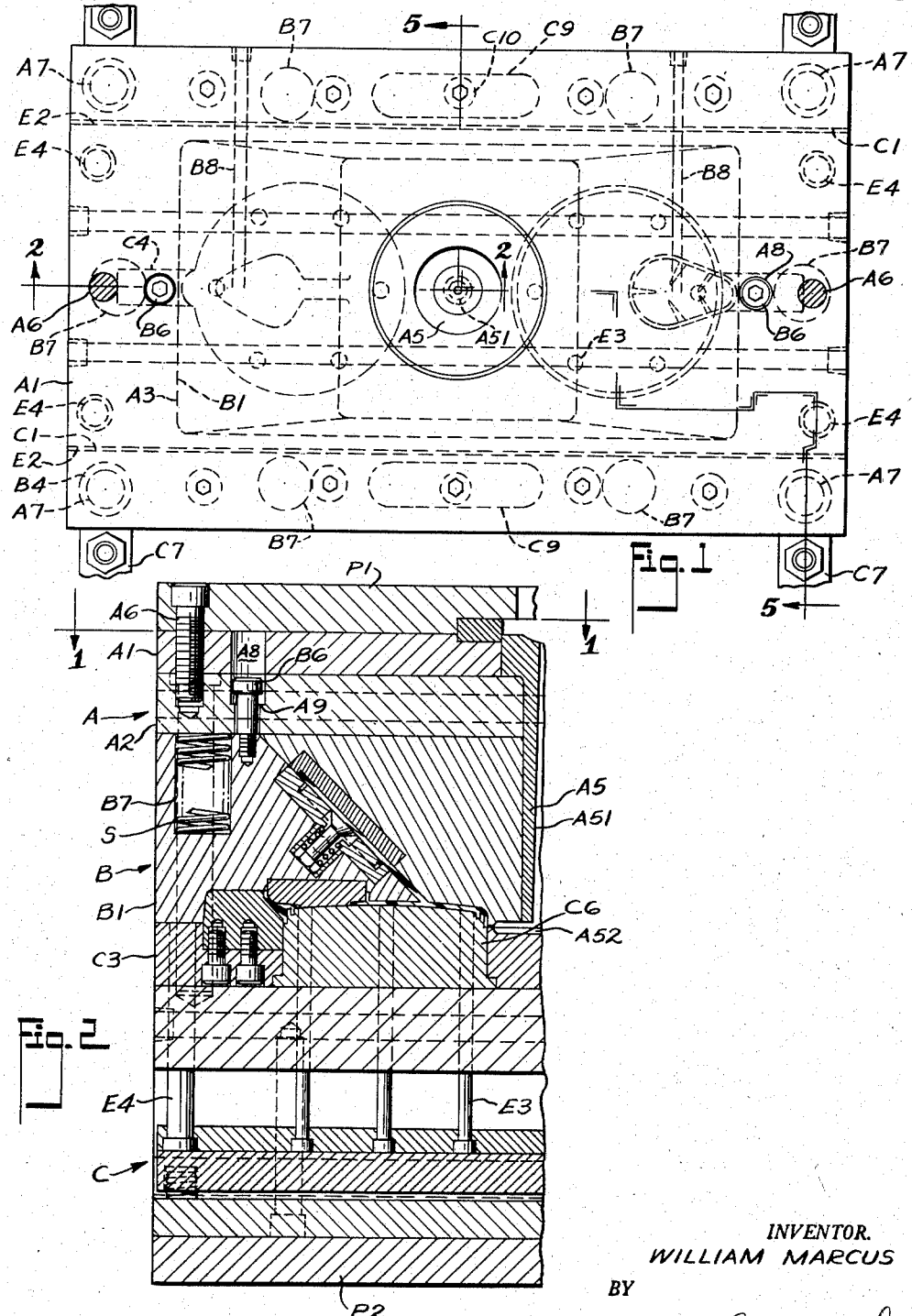

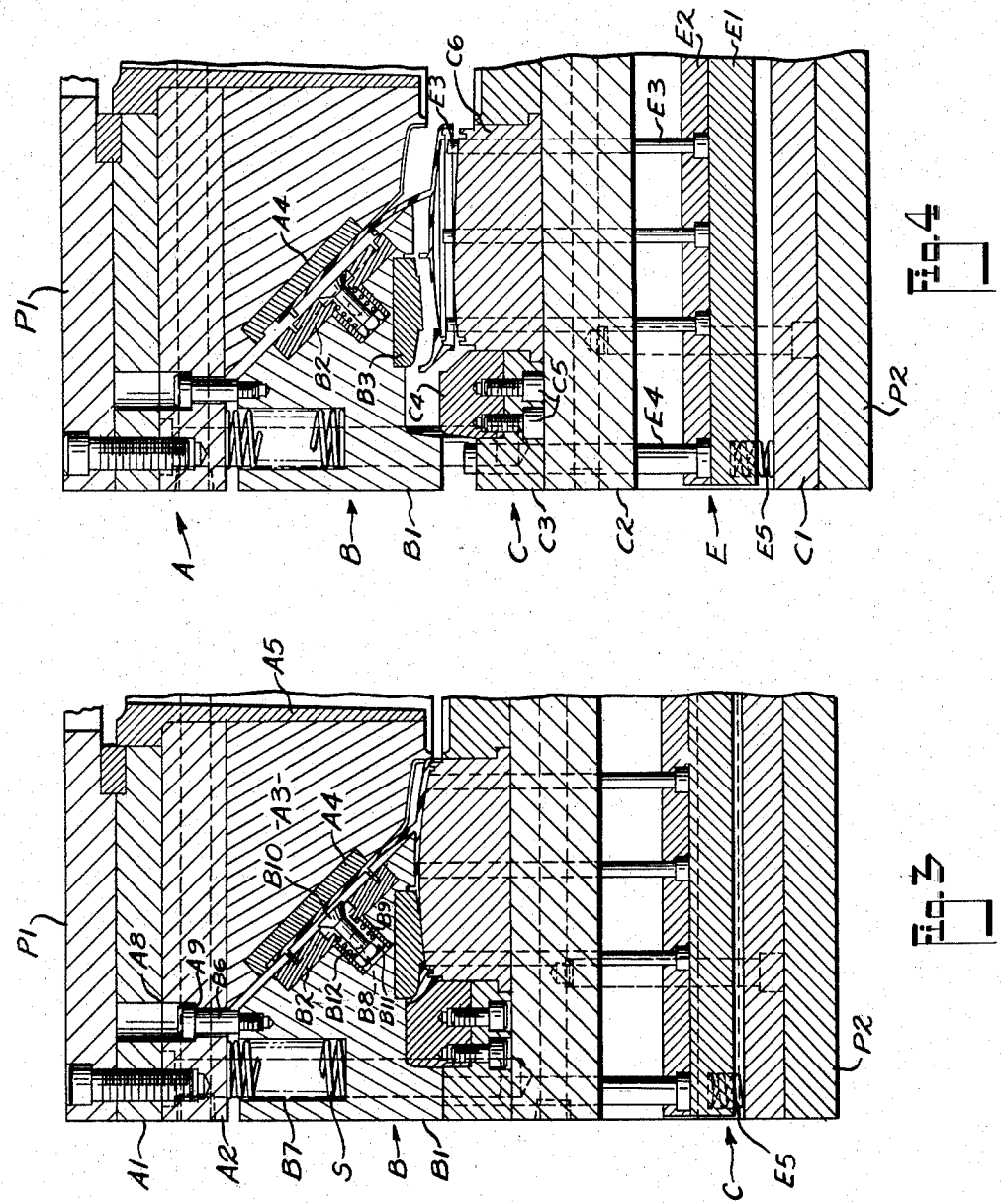

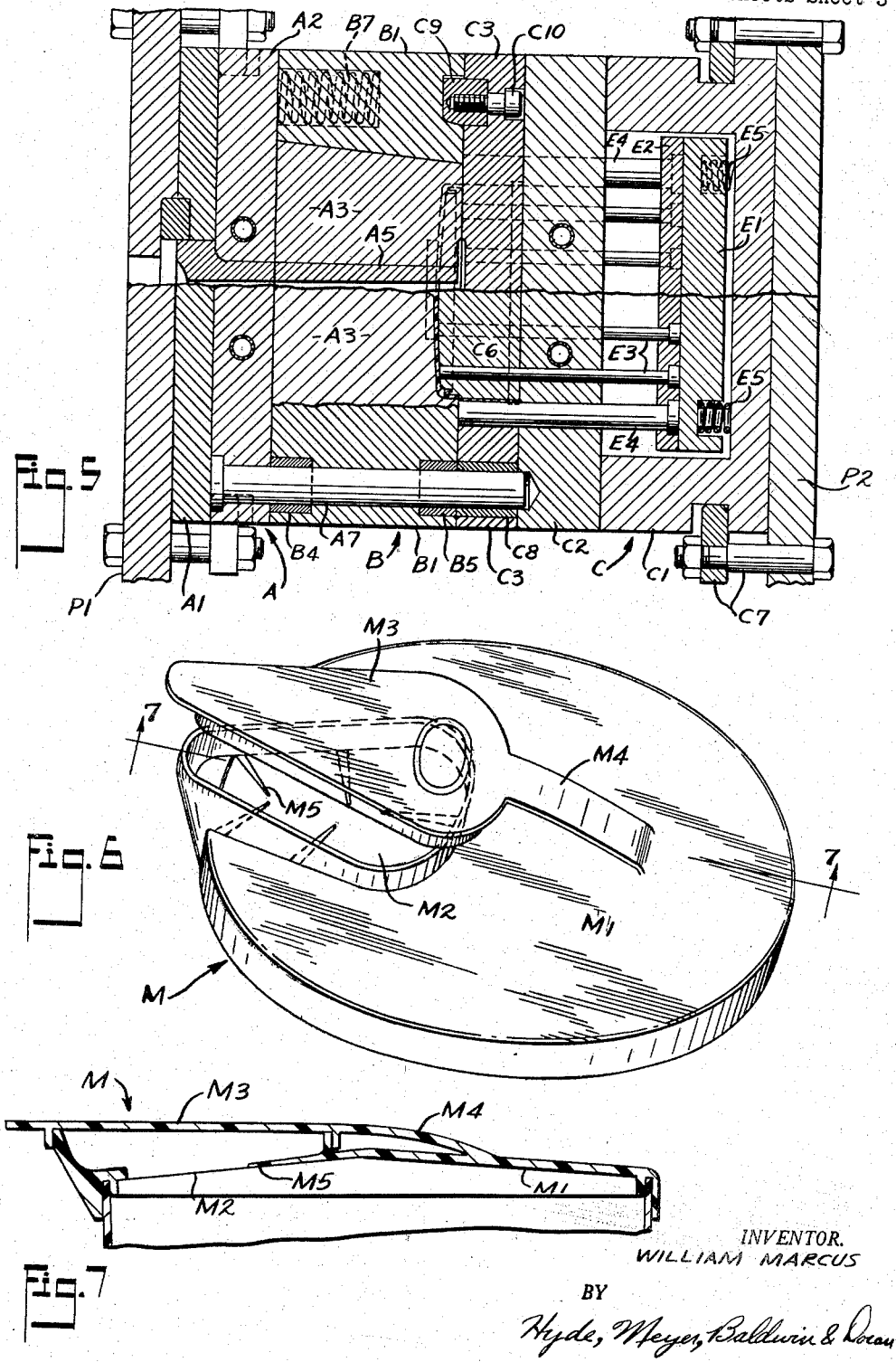

2,875,472

MOLDING APPARATUS FOR CONTAINER COVERS

William Marcus, Cleveland, Ohio

Application March 26, 1957, Serial No. 648,615

1 Claim. (Cl. 18—42)

This invention relates to improvements in a molding apparatus.

One of the objects of the present invention is to provide a molding apparatus for manufacturing a portion of a container wall, such as a pitcher cover, with a pouring opening in said wall, a cap adapted to overlie and close said opening, and a connecting means between said cap and said wall.

A further object of the present invention is to provide a die assembly having a plurality of core and cavity portions superimposed upon each other, and means operatively connecting these portions to permit relative movement between at least three of them.

A further object of the present invention is to provide a molding die for an integral part with said die including three molding die elements with each element cooperating with each of the others to form opposite surfaces on a wall portion of the part, and means operatively connecting the elements together and permitting movement of at least two relative to each other and relative to the third element.

A further object of the present invention is to provide an apparatus for molding an integral part having superimposed portions adapted for relative movement after manufacture wherein the apparatus is characterized by its ease of manufacturing a complex and difficult-to-manufacture part, its simplicity, and its ability to manufacture the aforesaid part in an inexpensive manner.

Other features of this invention reside in the arrangement and design of the parts or in the method steps for carrying out their appropriate functions.

Other objects and advantages of this invention will be apparent from the accompanying drawings and description and the essential features will be set forth in the appended claim.

In the drawings,

Fig. 1 is a side elevational view of the apparatus or molding die assembly of the present invention taken along the line 1—1 of Fig. 2 having two molded parts shown therein with the one on the left shown in true top view and the one on the right having the strap and cap removed;

Fig. 2 is a horizontal sectional view through one-half of the apparatus along the line 2—2 of Fig. 1 with the die assembly fully closed and the molded part in position;

Fig. 3 is a sectional view similar to Fig. 2 but with the middle and lower molding die elements displaced slightly downwardly from the upper die element to strip the cap and strap from the die elements;

Fig. 4 is a view similar to Fig. 2 but with the lower molding die element displaced downwardly from the Fig. 3 position to strip the cover from the middle and lower die elements prior to ejection of the molded part from the die assembly;

Fig. 5 is a vertical sectional view of the apparatus taken along the line 5—5 of Fig. 1;

Fig. 6 is a perspective view of the pitcher cover with the cap in the open position to permit fluid flow through the pouring opening thereof; while Fig. 7 is a vertical sectional view taken along the line 7—7 on the pitcher cover in Fig. 6 with the cap closing the pouring opening.

Before the apparatus here illustrated is specifically described, it is to be understood that the invention here involved is not limited to the structural details, arrangement of parts, or method steps here shown and disclosed, since apparatuses embodying the present invention may take various forms. It also is to be understood that the phraseology or terminology herein employed is for purposes of description and not of limitation since the scope of the present invention is denoted by the appended claim. While the apparatus of this invention might be adapted to various uses, it has been chosen to show the same as being used for manufacturing a pitcher cover having a pouring opening with a cap integrally formed to the cover by a connecting strap and adapted to be moved between open and closed position with respect to said opening but with the cap normally biased into said open position by said strap.

The drawings disclose a molding die or die assembly for molding a one-piece or integral part on a conventional injection type molding press having two press platens P1 and P2 having vertically extending, parallel surfaces to which the die or die assembly may be secured in any suitable manner. In the present disclosure, platen P1 is fixed while platen P2 is movable or reciprocates along a horizontal path toward and away from the fixed platen P1.

These die platens and die assembly cooperate together to form a one-piece or integral part M in Figs. 6 and 7 molded of resilient plastic and consisting of a cover or other similar wall M1 having an opening M2 with inwardly projecting fingers M5, a cap M3 in registry with opening M2 and adapted to be detachably connected to cover M1 for closing opening M2, and a connecting strap M4 between the cover and cap for attaching them together with the part M molded with cap M3 in an open position. Hence, when the part M is removed from the mold, the resiliency of the material will bias cap M3 out of contact with cover M1 into the open position of Figs. 4 and 6, but the user may overcome this resiliency by pressing the cap M3 down into frictional locking engagement with opening M2 and cover M1 into the closed position in Fig. 7.

The die or die assembly is called a modified three-plate construction having multiple die elements shown as first, second and third molding die elements A, B and C respectively with these respectively taking the form of the solid center plate element A secured against movement relative to platen P1, a loose center plate or intermediate element B, and a movable element or mold base C secured to platen P2 for movement therewith.

This die assembly is adapted to make two of the molded parts M simultaneously. Since each half of the mold is identical, only one-half of the mold in Fig. 1 is shown in Figs. 2, 3 and 4 with it being understood that the other half is similarly constructed but of opposite hand and moves simultaneously in a similar manner because the main parts of common elements in both halves are integral. In the closed position of Fig. 2, element A and element B cooperate together to form opposite surfaces on the wall portion of part M forming cap M3 and strap M4, element A and element C cooperate together to form opposite surfaces on another wall portion of the part M taking the form of a portion of the right-hand wall of cover M1 in Fig. 2, and element B and element C cooperate to form opposite surfaces on another wall portion of the part shown as the portion in Fig. 2 of the cover M1 extending to the left of strap M4 in Fig. 7 and forming the opening M2. These elements have at least two main cores and two main cavities arranged in die closed position to form molded part M. Element A has a cavity forming the top of cap M3 and strap M4, element C has a core portion forming the undersurface of cover M1, and element B has not only a core portion forming the bottom of cap M3 and strap M4 but also a cavity portion forming a portion of the top of cover M1. In addition to these main cores and cavities, element B has a core portion forming the upraised wall around opening M2 while the cavity portion in die element A forms the lower outside surface under the pouring lip at the left end of cover M1. These die element core and cavity portions, and the mold cavity portions formed thereby are super-imposed or overlapped in the direction of relative movement between die platens P1 and P2 so that the die elements can move relative to each other in a satisfactory manner and the proper shape molded part M will be formed therein by the communicating mold cavity portions for the cap M3, cover M1 and strap M4.

Each of the elements is formed of a plurality of parts with all parts of the same element having the same letter prefix and moving together generally as a unit. Element A includes two plates A1 and A2 in Figs. 1, 3 and 5 secured together in any suitable manner, a central portion A3, cavity insert A4 and sprue A5 rigidly connected together in any suitable manner. Element B in Figs. 1, 4 and 5 includes a die block B1 having a bore therethrough in the shape of a frustum of a rectangular pyramid in Figs. 1 and 4 to receive central portion A3, a die insert B2, and another die insert B3 interconnected together in any suitable manner. The die element C includes a die block C1 in Figs. 1, 4 and 5 of U-shape in cross section in Fig. 5 having parallel plates C2 and C3 secured together and over the ends of the arms by any suitable connecting means to close the open side of the U-shape of block C1. Parting line die insert C4 is secured to plate C3 by screws C5 while core insert C6 is secured to plate C3 by its enlarged base located between plates C2 and C3. Since there are two molded parts M produced simultaneously, each complete die assembly has two of the inserts A4, B2, B3, C4 and C6, but only one of each is shown in Figs. 2–4 because the mold cavity for only one of the parts is disclosed therein. Elements A and C are secured respectively to platens P1 and P2 in Figs. 2 to 5 by a plurality of screws A6 in Fig. 2 and die clamps C7 in Fig. 5 secured in grooves in the outer faces of die block C1.

Means is provided for operatively connecting elements A, B and C together for forming the mold cavity in a die closed position for molding part M, for moving elements B and C relative to element A in a first die opening step and then for moving element C relative to element B in a second die opening step to eject the molded part M from the die in the die open position of Fig. 4. The elements A, B and C are interconnected by four guide posts A7 in Figs. 1 and 5 located at the four corners and having a head carried between plates A1 and A2 so that they travel with element A. Bushings B4 and B5 carried by element B in Fig. 5 and a bushing C8 carried by plate C3 telescope over the guide posts A7 at each of the corners to keep the elements properly aligned. Two suitable locating blocks C9 are secured to plate C3 each by a screw C10 in Figs. 1 and 5 and are adapted to coact with recesses in die block B1 to assure proper alignment.

This connecting means also includes a lost motion connection between elements A and B and a resilient means normally urging element B away from element A and toward element C. This lost motion connection in Figs. 1, 2 and 3 takes the form of a bore A8 in plates A1 and A2 with a shoulder A9 at its inner end against which the enlarged head of screw B6 is adapted to engage with the screw B6 screwed into die body B1. There are two of these lost motion type connections at opposite ends of the mold cavities in Fig. 1. This screw head is normally urged toward engagement with shoulder A9 by a plurality of springs, here shown as six in number, with each spring S carried in a bore B7 in die block B1 with its free end bearing against die plate A2 so as to normally urge the elements A and B into either the Fig. 3 or Fig. 4 position.

After the molded part M is formed in the Fig. 2 position, the elements A and B are separated by a first die opening step in a manner to be described more in detail hereinafter so that an air actuated mold stripper can move to the Fig. 3 position and the molded part M is released from elements A and B to the illustrated dispensing position between elements A and B. Each half of the mold assembly has a passageway B8 in mold block B1 through which air pressure is admitted to bore B9 in die insert B2 between valve head B10 and a ring or nut B11 secured to the opposite end of the valve stem from valve head B10 in any suitable manner, such as by threads. Spring B12 normally keeps the valve head B10 against its seat in insert B2 during the molding step in Fig. 2, but the admission of the air under pressure into bore B9 will act against the force of the spring B12 to move the valve head B10 up off its seat to the Fig. 3 position to release the cap M3 from the die insert B2 when sufficient space exists between die elements A and B.

A similar ejection operation is provided during separation of elements B and C in a second die opening step while moving from the Fig. 3 to the Fig. 4 positions. This operation is provided by ejector E. This ejector E in Figs. 1 and 4 includes ejector plates E1 and E2 extending across both mold cavities, having entrapped therebetween in alignment with each mold cavity the heads of six ejector pins E3, and having four actuating rods E4 on the four corners of the plates E1 and E2 extending horizontally across the whole die assembly in horizontal alignment with both mold halves. Several suitably placed springs E5 are located between plate E1 and the connecting web portion between the arms of die block C1 so as to urge plate E1 away from said connecting portion. Springs E5 also urge the ends of the actuating rods E4 in Fig. 2 opposite their enlarged heads against the surface of die block B1 adjacent die plate C3. Hence, as long as elements B and C are in the Fig. 2 or 3 position, ejector pins E3 are withdrawn into die insert C6 so that the cover M1 of the molded part M is properly formed. However, as soon as the die elements B and C begin to separate, the springs E5 urge ejector pins E3 out of the molding surface of the die insert C6 so that the cap M1 will be released from the mold core formed by the insert C6.

The mode of operation should now be easily understood. When the die elements are in the closed position of Fig. 2, the plastic material is forced under pressure from the heating chamber appearing above fixed platen P1 in Fig. 2, through sprue passageway A51 in sprue A5, into receiver cavity A52 formed at the inner end thereof, and through branch passageways into the two mold halves for making the two different molded parts M so that they are properly formed as the elements A, B and C are held together by the platens of the molding machine. This molding material is injected in a single shot into all of the mold cavity portions formed between the elements, and the material is preferably of a plastic, such as a polyethylene, which will have the desired resilient characteristics. After the molding operation is completed, the movable platen P2 is moved away from the fixed platen P1 in a first die opening step with the springs S and the lost motion connection provided by bolt B6 permitting elements B and C to move with platen P2 away from fixed element A to provide relative movement between them. The springs S cause the element B to follow the movement of element C. As the element B approaches the Fig. 3 position, a suitable air valve is automatically opened by any suitable conventional control, such as a control having a microswitch (not shown) on the press frame responsive to the position of element B, so that air under pressure enters the passageways B8 and causes the valve head B10 to move up off its seat so that the upward movement of valve head B10 and the outrush of air from bore B9 will release the cap M3 from the core type die insert B2 in the manner shown in Fig. 3. This releases the cap M3 and strap M4 of the molded part M to a dispensing position between elements A and B so that it will properly be dispensed at a later time because it no longer adheres to the core insert B2. As the movable platen P2 moves farther away from fixed platen P1, the heads of screws B6 engaging shoulders A9 prevent further movement of die element B so that die element C then can move away from die element B to provide relative movement between elements B and C in a second die opening step. This separating action between elements B and C causes the ejector spring or springs E5 to move the ends of ejector pins E3 out of the surface of the core insert C6 so as to move the molded parts M to a dispensing position in Fig. 4 between and released from die elements B and C. Now, gravity will cause the molded parts M to fall out from between the die elements so that the parts will be dispensed from the die assembly. This gravity fall-out is possible because Fig. 1 is a side elevational view and Figs. 2–4 are horizontal sectional views of the apparatus. The step of retracting the element C with the core C6 away from the sprue passage A51 breaks the sprue so that the molded parts can fall freely therefrom.

Each molded part M has desirable characteristics. It may be used as a cover for a pouring pitcher with the liquid adapted to be poured through the opening M2 with the integral fingers M5 adapted to permit insertion of ice cubes within the pitcher and to hold the ice cubes back while the liquid is poured. The cap M3 is adapted to be snapped over the opening. The flexible strap M4 has sufficient stiffness or "memory" so that cap M3, when opened during use, will tend to remain open in Fig. 6 because the cap M3 and strap M4 were molded in an open position in Fig. 2. However, the coaction between the downwardly extending flange on the cap M3 and upwardly extending flange on cover M1 surrounding the opening M2 have sufficient friction when telescoped together to hold the cap M3 in the closed position shown in Fig. 7.

It should be readily apparent that, in a broader sense, cap M3 and cover M1 may take the form of any suitable accessory part and wall part respectively connected together.

Although this apparatus is disclosed for injection molding, it could be used for die casting or compression molding. In compression molding, a slug of material is placed in the die cavity and the die elements are closed to form the part M. In all three forms of casting or molding, the molding material is inserted into the cavity and then is forced in one operation into all cavity portions.

Various changes in details and arrangement of parts can be made by one skilled in the art without departing from either the spirit of this invention or the scope of the present claim. Also, many features of this disclosed apparatus may be used to make other articles in addition to the aforesaid described part M, as anyone skilled in the art will readily appreciate.

What I claim is:

Molding die means for forming integrally a cover having a pouring opening and a cap for said opening connected by a strap to an intermediate portion of said cover spaced from said opening, said die means comprising first, second and third molding die elements, said first element having dies for forming the top of said cap and strap and the top of that portion of said cover to one side of said strap-to-cover connection away from said opening, said second element having dies for forming the bottom of said cap and strap and the top of that portion of said cover at the other side of said strap-to-cover connection and around said opening, said third element having dies for forming the bottom of said cover, there being inter-communicating molding cavities between said dies, and guide means holding said elements always in longitudinal alignment and providing relative movement between said first and second element, between said first and third element and between said second and third element for stripping a completed molded article from between said elements.

References Cited in the file of this patent

UNITED STATES PATENTS

| | | |
|---|---|---|
| 2,378,586 | Schultz | June 19, 1945 |
| 2,494,777 | Patterson et al. | Jan. 17, 1950 |
| 2,558,026 | Wilson | June 26, 1951 |
| 2,577,350 | Morin | Dec. 4, 1951 |

FOREIGN PATENTS

| | | |
|---|---|---|
| 1,039,555 | France | Dec. 29, 1954 |
| 62,145 | France | Dec. 29, 1954 |
| | (2nd addition to No. 1,039,555) | |